Oct. 10, 1961 R. L. BURKLAND ET AL Re. 25,052
ADDITIVE CONTROL DEVICE
Original Filed May 6, 1957
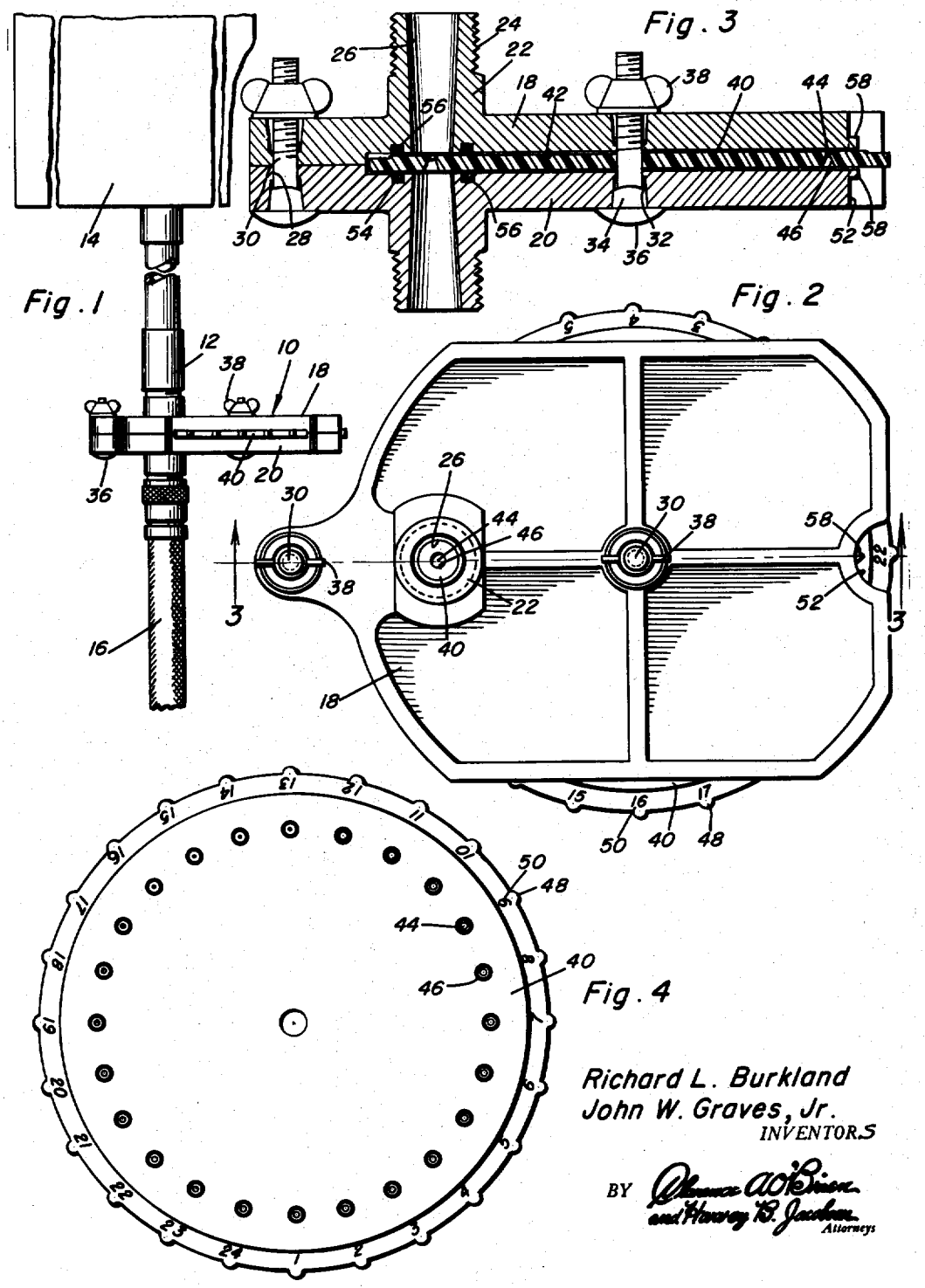
Richard L. Burkland
John W. Graves, Jr.
INVENTORS
BY Thomas A. O'Brien and Harvey B. Jacobson
Attorneys United States Patent Office Re. 25,052
Reissued Oct. 10, 1961

25,052
ADDITIVE CONTROL DEVICE

Richard L. Burkland, 734 E. Desert Park Lane, and John W. Graves, Jr., 415 E. Las Palmaritas, both of Phoenix, Ariz.

Original No. 2,891,579, dated June 23, 1959, Ser. No. 657,391, May 6, 1957. Application for reissue Oct. 3, 1960, Ser. No. 60,235
3 Claims. (Cl. 138—45)

Matter enclosed in heavy brackets [ ] appears in the original patent but forms no part of this reissue specification; matter printed in italics indicates the additions made by reissue.

The present invention generally relates to an additive control device and more particularly to a device for facilitating the accurate control of the rate of application of anhydrous ammonia into irrigation water, or the direct injection of anhydrous ammonia into the soil.

An object of the present invention is to provide an additive control device for accurately controlling the rate of flow of conditioning material such as anhydrous ammonia or the like which incorporates structural features permitting the rate of flow to be easily changed by merely revolving a disk having a plurality of circumferentially spaced orifices disposed therein.

A further object of the present invention is to provide an additive control device which is extremely simple in construction, easy to orientate in any desired position for controlling the flow of fluid material, accurate in its control of flow and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the flow control device shown disposed in a discharge line from a supply tank;

FIGURE 2 is a plan view of the additive control device of the present invention;

FIGURE 3 is a transverse, vertical sectional view taken substantially upon a plane passing along section line 3—3 of FIGURE 2 illustrating the details of construction of the device; and FIGURE 4 is a plan view of the control disk showing the relationship of the different sized orifices and the indicia associated therewith for indicating the size.

Referring now specifically to the drawings, the numeral 10 generally designates the additive control device of the present invention which may be installed in or connected to a discharge pipe 12 on a supply tank 14 with the discharge side of the additive control device being connected with a flexible hose 16 or any other suitable conduit. The supply tank 14 may be of any size, shape or the like for transporting or otherwise supplying anhydrous ammonia or similar soil or water conditioning material.

The control device 10 includes an upper plate 18 and a lower plate 20 of identical construction. Each of the plates 18 and 20 includes an outwardly extending tubular extension 22 having an external threaded portion 24 for engagement with a fitting of a conduit. The plate and the extension 22 includes a passageway 26 extending therethrough for providing a path of flow of anhydrous ammonia. The plates 18 and 20 are also provided with a plurality of aligned openings 28 for receiving fastening bolts 30 therethrough. Each of the openings 28 is provided with a countersunk portion 32 receiving a polygonal portion 34 of the fastening bolt 30 which is disposed adjacent the rounded head 36 thereof with the other end of the bolt being provided with a wing nut 38 whereby the bolts may be inserted from the top or the bottom of the control device and the wing nuts 30 may readily adjust and tightly clamp the plates together.

Rotatably disposed between the plates 18 and 20 is a control disk 40 received in a recessed inner surface 42 of the plates 18 and 20.

The disk 40 is provided with a plurality of orifices 44 being countersunk on the downstream side of the disk to facilitate the escapement of material being metered. The orifices 44 are of different sizes and are circumferentially spaced.

A projecting knob 48 is provided on the periphery of the disk 40 and indicia 50 is disposed adjacent the knob for indicating the size of the orifice 44. The knob 48 and indicia 50 is revealed by a cut-away notch 52 in the end edge of the plates 18 and 20 remote from the projection 22 whereby finger pressure may be exerted on the periphery of the disk for rotating the same and altering the control characteristics of the disk 40. It is noted that the indicia 50 actually represents a size of the orifice diametrically opposed therefrom or actually designates the size of the orifice in alignment with the passageway 26.

In concentric relation to the passageway 26, each of the plates 18 and 20 is provided with an annular recess 54 receiving an annular O-ring seal 56 which sealingly engages the disk 40 in encircling relation to the passageway for preventing leakage thereof.

It is also noted that an indicating pointer 58 is provided in the recess 22 for alignment with the indicia 50 and the orifices may range in size from .01 of an inch to .050 of an inch although the range may vary as desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

*1.* A flow control device for disposal in a liquid flow line comprising a housing consisting of a pair of substantially identical rectangular plates having a constant thickness over a major portion of its area, said plates having smooth inner surface areas facing each other, a circular disk disposed between the plates, said disk having parallel flat surfaces for engagement with the smooth surface of the plates, the width of the plates being less than the diameter of the disk whereby the periphery of the disk will project beyond the side edges of the housing for enabling rotation of the disk, each plate having a liquid flow opening therein adjacent one end thereof with the openings being aligned wtih each other, tubular adapters connected with each of the plates in alignment with the openings for providing a liquid flow path, said adapters extending from the outer surfaces of the plates and being adapted to connect to a liquid flow line, said disk having a central opening, each of said plates having an opening therein in alignment with the central opening in the disk, means extending through the openings in the plate and the central opening in the disk for rotatably retaining the disk and urging the plates towards the disk, the end edge of each plate adjacent the tubular adapter having a laterally extending apertured ear disposed radially outwardly of the periphery of the disk, a clamp means extending through the ears for urging the plates towards each other adjacent the end edge having the tubular adapters thereon, each of said plates having an annular recess in the smooth inner surface area thereof with the recess being disposed in spaced concentric relation to the liquid flow opening, an O-ring seal in each recess, said seal being constructed of resilient material and projecting beyond the surface of the plate for frictional sealing engagement with the disk, said disk having a plurality of circumferentially spaced orifices extending therethrough, said orifices being disposed for alignment with the liquid flow openings and being of different sizes, the spacing between the orifices being greater than the diameter of the O-ring seal whereby only a single orifice can be encircled by the seal, numerical indicia on said disk radially outwardly of the orifices for indicating the size of the orifices, a plurality of knobs on the periphery of the disk for aiding in the rotation thereof, the end edge of each plate remote from the tubular adapters having a notch therein revealing the periphery of the disk and the numerical indicia thereon, a pointer in said notch for alignment with the indicia for indicating alignment of a diametrically opposed orifice with the liquid flow path and the size of that orifice, each of said orifices being countersunk on the downstream side thereof to facilitate escapement of liquid from the orifice, the smooth inner surface area of each plate disposed radially outwardly of the periphery of the disk extending longitudinally inwardly and terminating in flat surfaces disposed adjacent each other for maintaining the plates and disk in generally parallel relation whereby the entire periphery of the O-ring seals will engage the disk.

*2. A flow control device for disposal in a liquid flow line comprising a housing consisting of a pair of substantially identical plates having a constant thickness over a major portion of its area, said plates having smooth inner surface areas facing each other, a circular disk disposed between the plates, said disk having parallel flat surfaces opposed to the smooth surface of the plates, the width of the plates being less than the diameter of the disk whereby the periphery of the disk will project beyond the side edges of the housing for enabling rotation of the disk, each plate having a liquid flow opening therein adjacent one end thereof with the openings being aligned with each other, tubular adapters on each of the plates in alignment with the openings for providing a liquid flow path, said adapters extending from the outer surfaces of the plates and being adapted to connect to a liquid flow line, said disk having a central opening, means carried by the plates engaging the central opening in the disk for rotatably retaining the disk, the end edge of each plate adjacent the tubular adapter having a laterally extending apertured ear disposed radially outwardly of the periphery of the disk, a clamp means extending through the ears for urging the plates towards each other adjacent the end edge having the tubular adapters thereon, each of said plates having an annular recess in the smooth inner surface area thereof with the recess being disposed in spaced concentric relation to the liquid flow opening, an O-ring seal in each recess, said seal being constructed of resilient material and projecting beyond the surface of the plate for sealing engagement with the disk, said disk having a plurality of circumferentially spaced orifices extending therethrough, said orifices being disposed for alignment with the liquid flow openings and being of different sizes, the spacing between the orifices being greater than the diameter of the O-ring seal whereby only a single orifice can be encircled by the seal, numerical indicia on said disk radially outwardly of the orifices for indicating the size of the orifices, the end edge of each plate remote from the tubular adapters having a notch therein revealing the periphery of the disk and the numerical indicia thereon, a pointer in said notch for alignment with the indicia for indicating alignment of a diametrically opposed orifice with the liquid flow path and size of that orifice, each of said orifices being countersunk on the downstream side thereof to facilitate escapement of liquid from the orifice.*

*3. The structure as defined in claim 2 wherein said disk is provided with a plurality of peripherally spaced knobs on the periphery thereof for facilitating the rotational movement of the disk, the portion of the plates disposed peripherally outwardly of the disk extending laterally for forming abutments for engagement with each other and maintaining the plates and disk in generally parallel relation whereby the entire periphery of the O-ring seals will engage the opposite surfaces of the disk.*

References Cited in the file of this patent or the original patent

UNITED STATES PATENTS

| | | |
|---|---|---|
| 1,613,138 | Seymour et al. | Jan. 4, 1927 |
| 1,813,100 | Swindle | July 7, 1931 |
| 1,913,149 | Atwater | June 6, 1933 |
| 2,219,504 | Willis | Oct. 29, 1940 |
| 2,537,598 | Mason | Jan. 9, 1951 |
| 2,548,553 | Neves | Apr. 10, 1951 |